(12) United States Patent
Suzuki (10) Patent No.: US 7,210,665 B2
(45) Date of Patent: May 1, 2007

(54) ACTUATOR INTEGRALLY PROVIDED WITH FAIL-SAFE FUNCTION

(75) Inventor: Yuzuru Suzuki, Shizuoka (JP)

(73) Assignee: Minebea Co., Ltd., Kitasaku-gun (JP)

( * ) Notice: Subject to any disclaimer, the term of this patent is extended or adjusted under 35 U.S.C. 154(b) by 8 days.

(21) Appl. No.: 11/180,598

(22) Filed: Jul. 14, 2005

(65) Prior Publication Data

US 2006/0011879 A1    Jan. 19, 2006

(30) Foreign Application Priority Data

Jul. 15, 2004   (JP) .............................. 2004-208122

(51) Int. Cl.
*F16K 31/04* (2006.01)
(52) U.S. Cl. .................... 251/69; 251/129.11
(58) Field of Classification Search ..............................
251/129.11–129.13, 69
See application file for complete search history.

(56) References Cited

U.S. PATENT DOCUMENTS

| | | | | |
|---|---|---|---|---|
| 4,393,319 A | * | 7/1983 | Bock ............................ | 310/80 |
| 4,480,614 A | * | 11/1984 | Kobashi et al. ......... | 251/129.12 |
| 5,060,910 A | | 10/1991 | Iwata et al. | |
| 5,832,944 A | * | 11/1998 | Lindner .................. | 251/129.11 |
| 5,865,272 A | * | 2/1999 | Wiggins et al. ............. | 74/89.27 |
| 5,983,743 A | * | 11/1999 | McGregor et al. ...... | 251/129.13 |
| 6,224,034 B1 | * | 5/2001 | Kato et al. .............. | 251/129.11 |
| 2006/0071190 A1 | * | 4/2006 | Pfister .................... | 251/129.11 |

FOREIGN PATENT DOCUMENTS

| | | |
|---|---|---|
| DE | 44 23 313 A1 | 1/1996 |
| JP | 1-316581 | 12/1989 |
| JP | 2003-042324 A | 2/2003 |
| JP | 2003-222259 A | 8/2003 |
| JP | 2003-227575 | 8/2003 |
| WO | WO 2004/038269 A1 | 5/2004 |

* cited by examiner

*Primary Examiner*—John Bastianelli
(74) *Attorney, Agent, or Firm*—Foley & Lardner LLP (57) ABSTRACT

An actuator includes: a rotor assembly including an output shaft having a male screw portion and having a pin attached thereto, and a sleeve having a female screw portion and threadedly engaged with the male screw portion of the output shaft so as to convert a rotary motion of the sleeve into a linear motion of the output shaft; a stator assembly disposed around the rotor assembly; a housing attached to the stator assembly; a coil spring; and a spring holder having slits to guide the pin into an axial direction. In the actuator, the coil spring and the spring holder constitute a fail-safe mechanism and are contained inside the housing, and the coil spring is arranged at such a location that the output shaft is caused to move in a direction to achieve a fail-safe operation. Thus, the actuator incorporates a fail-safe mechanism as an integral unit.

9 Claims, 8 Drawing Sheets

ACTUATOR INTEGRALLY PROVIDED WITH FAIL-SAFE FUNCTION

BACKGROUND OF THE INVENTION

1. Field of the Invention

The present invention relates to an actuator for a flow control valve to control flow in a fluid channel, and more particularly to an actuator integrally provided with a fail-safe function to mandatorily actuate a valve so as to provide a safe condition for a fluid channel when electric power supply is accidentally cut off for some reason.

2. Description of the Related Art

A flow control valve is conventionally used for gas flow control performed with a shutoff valve provided in a fluid channel of a gas supply equipment, and also for switching control of a refrigerant channel for air-conditioning. Such a flow control valve is driven by an actuator in which that the rotary motion of a motor shaft is converted into the linear motion of a valve by means of a pinion gear or a screw structure.

Recently, a permanent magnet (PM) type stepping motor, which achieves a high positioning accuracy by means of step input, is increasingly combined with a mechanism to convert a rotary motion into a linear motion so that it can be used as an actuator.

A flow control valve is used in, for example, a gas meter, which is equipped with a safety mechanism to prevent troubles. Such a safety mechanism has what is called a fail-safe function incorporated in a gas shutoff valve system, and operates such that a flow control valve is automatically shut so as to close a gas channel when power supply is stopped due to electric power failure or due to trouble of a control circuit.

Figure 7:
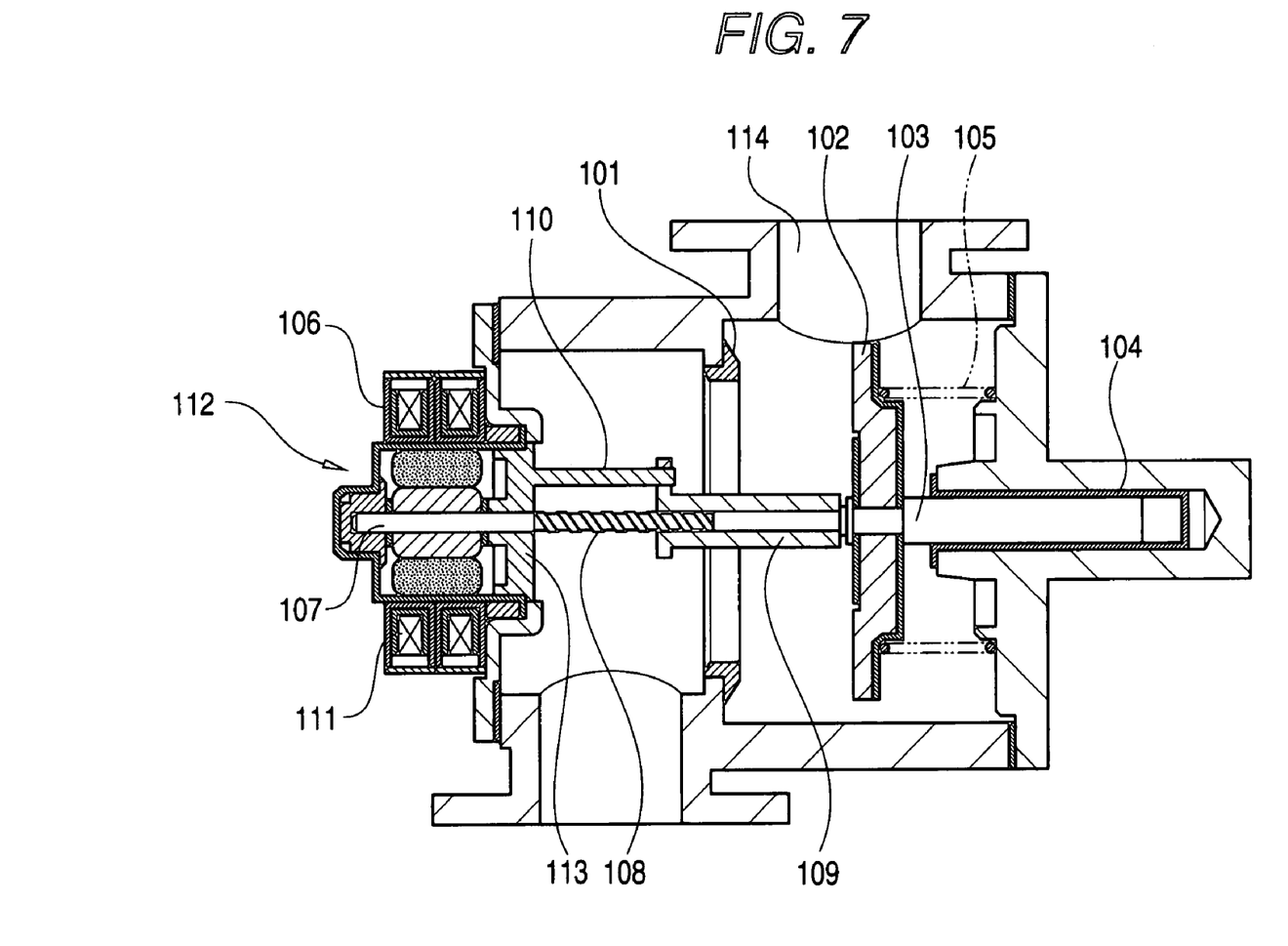
FIG. 7 is a schematic structural view of a conventional gas shutoff valve system.

FIG. 7 is a schematic structural view of a conventional gas shutoff valve system provided with such a fail-safe function (refer to, for example, Japanese Patent Application Laid-Open No. 2003-042324).

The gas shutoff valve system shown in FIG. 7 includes a valve seat 101, a valve plug 102 adapted to block the valve seat 101, a valve shaft 103 connected to the valve plug 102, a guide 104 to cause the valve shaft 103 to move linearly, a spring 105 to press the valve plug 102 toward the valve seat 101, a stepping motor 106 as a rotary device having coils 111 and a rotor 112 with an output shaft 107, a feed screw 108 as a feeding element formed on the output shaft 107, a moving block 109 engaging threadedly with the feed screw 108 so as to thrust the valve plug 102, a rotation stopper 110 to prohibit the moving block 109 from rotating, and a lid 113. When something abnormal occurs in gas supply, pulsing currents with respective phases different from each other are applied to the coils 111 so as to rotate the rotor 112, whereby the moving block 109 moves toward the lid 113, and the valve plug 102, urged by the spring 105, is caused to move together so as to block the valve seat 101 thus stopping gas from flowing through.

Figure 8:
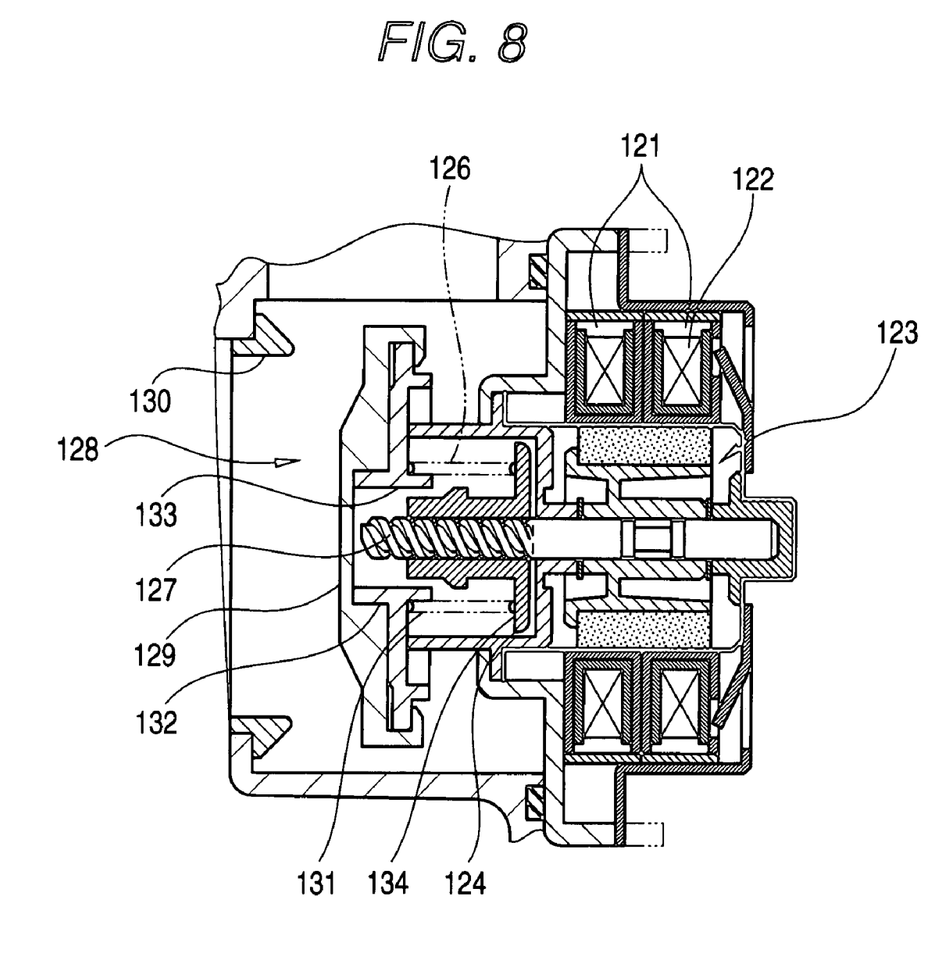
FIG. 8 is a schematic structural view of another conventional gas shutoff valve system.

FIG. 8 is a schematic structural view of another conventional gas shutoff valve system (refer to, for example, Japanese Patent Application Laid-Open No. 2003-222259).

In the gas shutoff valve system shown in FIG. 8, when there is something abnormal detected in gas supply, pulsing currents with respective phases different from each other are applied to respective wires 122 of coils 121 thereby rotating a rotor 123, and then a moving block 124, which engages threadedly with a feed screw 127 fixedly connected to the rotor 123, and which has a groove engaging with a rib 126 for prohibition of rotation, is caused to linearly move in the axial direction due to the feed screw 127 rotating together with the rotor 123. A valve plug 128 is engagingly attached to the moving block 124, and when the moving block 124 moves toward a valve seat 130, a sealing pad 129 of the valve plug 128 is brought into contact with the valve seat 130. And, when the moving block 124 further moves toward the valve seat 130, a coil spring 131 is further contracted so that a spring retaining portion 131 of the moving block 124 is brought into contact with a cylinder portion 133 of a sealing pad holding member 132, and the sealing pad 129 sags and is contracted, which causes the repulsion of the moving block 124 to exceed the thrust of the feed screw 127 consequently stopping the rotation of the rotor 123. At this time, the valve plug 128 is firmly pressed against the valve seat 130 by force of the coil spring 131, and gas flow is shut off. If electric power is turned off in this state, the rotor 123 keeps its position due to holding torque, and the valve plug 128 is kept pressed against the valve seat 130 so as to keep the valve closed.

In the gas shutoff valve system shown in FIG. 7 as disclosed in the aforementioned Japanese Patent Application Laid-Open No. 2003-042324, the spring 105 to press the valve plug 102 against the valve seat 101 is provided in a gas channel 114, which makes the system complicated, and the spring 105 is difficult to replace, which results in deteriorated workability in maintenance.

In the gas shutoff valve system shown in FIG. 8 as disclosed in the aforementioned Japanese Patent Application Laid-Open No. 2003-222259, since the coil spring 131 is attached at the valve plug 128, the valve plug 128 is prohibited from downsizing. Also, the coil spring 131 must be prepared so as to fit to the configuration of each valve plug 128, which leads to an increased number of components.

SUMMARY OF THE INVENTION

The present invention has been made in light of the above problems, and it is an object of the present invention to provide an actuator which leverages a motor to actuate a flow control valve in a fluid channel, and which has built-in capability of performing a fail-safe operation, wherein maintenance work can be performed easily.

In order to achieve the object, according to an aspect of the present invention, an actuator comprises: (a) a rotor assembly including *an output shaft having a screw portion constituted by a male screw formed on an outer circumference of the output shaft, having a plain rod portion toward the other end thereof, and having a pin attached to the plain rod portion so as to protrude therefrom toward an outside of the pin in a radial direction, *a sleeve having a screw portion constituted by a female screw formed on an inner circumference of the sleeve, the sleeve rotatably supported by bearings disposed respectively at both axial ends of the sleeve, wherein the screw portion of the sleeve is threadedly engaged with the screw portion of the output shaft so as to convert a rotary motion of the sleeve into a linear motion of the output shaft, and *a magnet fixedly disposed at an outer circumference of the sleeve; (b) a stator assembly functioning to rotate the magnet, and including a coil, a bobbin having the coil wound therearound, and **stator yokes coupled to each other so as to sandwich the bobbin; (c) a housing having a hollow-cylindrical configuration, and attached to the stator assembly; and (d) a fail-safe mechanism in the housing, the fail-safe mechanism comprising a coil spring disposed around the output shaft, and a spring holder disposed around the output shaft, and having slits to guide the pin attached to the output shaft into an axial direction movement. In the actuator described above, the coil spring and the spring holder constitute a fail-safe mechanism and are contained inside the housing. Consequently, a fail-safe mechanism is incorporated in the actuator as an integral unit, and therefore the mounting work and the maintenance work can be implemented easily.

In the aspect of the present invention, the coil spring may be arranged at such a location that the output shaft is caused to move in a direction to achieve a fail-safe operation. Consequently, a versatile fail-safe operation is available according to the arrangement of the coil spring.

In the aspect of the present invention, the coil spring may be an extension spring and located between the pin attached to the output shaft and the spring holder so that when electric power supply to the coil of the stator assembly is cut off, the output shaft is caused to move toward the stator assembly by force of the coil spring. This arrangement is suitable for a fail-safe operation achieved by opening a valve.

In the aspect of the present invention, the actuator may further comprise a stopper plate disposed on one of the bearings located closer to the housing, and the coil spring may be an extension spring and located between the pin attached to the output shaft and the stopper plate so that when electric power supply to the coil of the stator assembly is cut off, the output shaft is caused to move away from the stator assembly by force of the coil spring. This structure is suitable for a fail-safe operation achieved by shutting valve.

In the aspect of the present invention, the coil spring may be a compression spring and located between the pin attached to the output shaft and the spring holder so that when electric power supply to the coil of the stator assembly is cut off, the output shaft is caused to move away from the stator assembly by force of the coil spring. This arrangement is suitable for a fail-safe operation achieved by shutting a valve.

In the aspect of the present invention, the actuator may further comprise a stopper plate disposed on one of the bearings located closer to the housing, and the coil spring may be a compression spring and located between the pin attached to the output shaft and the stopper plate so that when electric power supply to the coil of the stator assembly is cut off, the output shaft is caused to move toward the stator assembly by force of the coil spring. This arrangement is suitable for a fail-safe operation achieved by opening a valve.

In the aspect of the present invention, the housing may include a flange portion at one end portion thereof, and may be fixedly attached to the stator assembly by means of a front plate pressing on the flange portion. Thus, the housing is securely attached to the stator assembly.

In the aspect of the present invention, the actuator may further comprise a rotor case having a cup-like configuration, the rotor case being disposed between the rotor assembly and the stator assembly so as to constitute a hermetic partition therebetween. Consequently, a gap between the rotor assembly and the stator assembly is completely sealed up to ensure a safe condition.

In the aspect of the present invention, the actuator may further comprise a sealing member disposed around the housing. This structure seals up a gap between the housing and the equipment applied, thus a safe condition is ensured.

DETAILED DESCRIPTION OF THE PREFERRED EMBODIMENTS

Preferred embodiments of the present invention will hereinafter be described with reference to the accompanying drawings.

Figure 1:
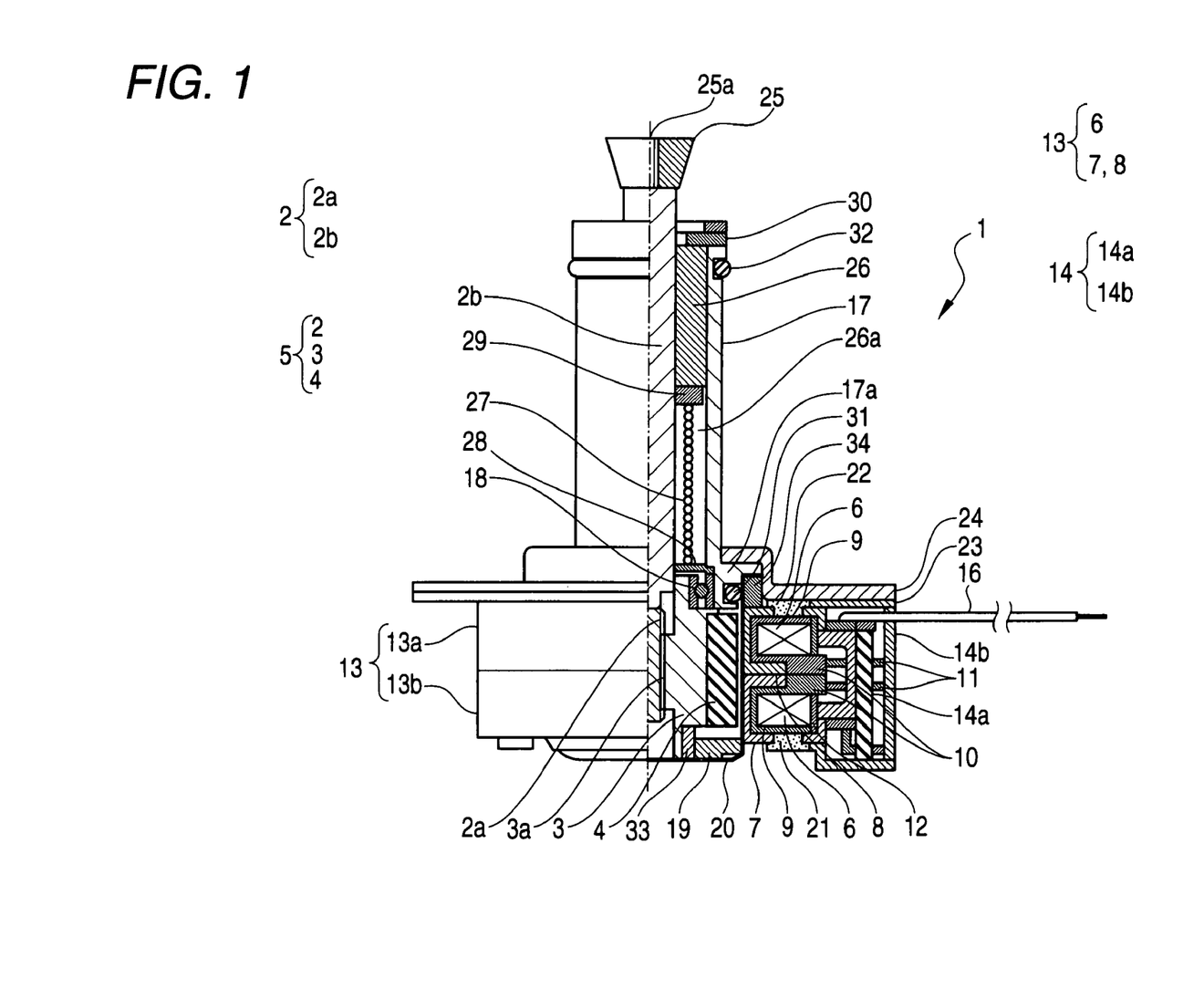
FIG. 1 is a side view (partly cross sectioned) of an actuator according to a first embodiment of the present invention.

Referring to FIG. 1, an actuator 1 according to a first embodiment of the present invention generally comprises a rotor assembly 5, a stator assembly 13, and a housing 17.

The rotor assembly 5 includes an output shaft 2, a sleeve 3, and a magnet 4 with multi-polar magnetization. The output shaft 2 has a screw portion 2a and a plain rod portion 2b, the sleeve 3 is formed of synthetic resin and has a screw portion 3a located at an elevated portion on its inner circumferential surface, and the magnet 4 is shaped hollow-cylindrical and fixedly disposed at the outer circumference of the sleeve 3. The screw portion 2a is located at a portion of the outer circumferential surface of the output shaft 2 and engages threadedly with the screw portion 3a of the sleeve 3. A head piece 25 is attached to an open end of the plain rod portion 2b of the output shaft 2, and a valve plug (not shown in FIG. 1) is attached to the head piece 25 so as to oppose a valve seat (not shown in FIG. 1) disposed in a fluid channel (not shown in FIG. 1) thereby functioning to open and close the fluid channel.

The stator assembly 13 is disposed outside the magnet 4 of the rotor assembly 5 and includes first and second stator units 13a and 13b, each of which has stator yokes 7 and 8 combined so as to house a bobbin 9 having a coil 6 wound therearound. The stator assembly 13 further includes a wiring board unit 14 and a front plate 23 which is placed on the first stator unit 13a coaxially stacked on the second stator unit 13b. The stator yokes 7 and 8 each include a plurality of pole teeth facing the outer circumference of the magnet 4 of the rotor assembly 5. The bobbin 9 has a substantially squared C-shaped cross section and is provided integrally with a terminal block 10, and terminal pins 11 are implanted in the terminal block 10. A cover 12 is attached so as to enclose the coil 6 thereby preventing dusts from coming in to sit on the coil 6. The front plate 23 is for attachment of the actuator 1 to an outside apparatus. The constituent components described above are resin injection molded for solid structure. The wiring board unit 14 includes a printed board 14a and a pin retainer 14b. The pin retainer 14b is disposed outside the terminal blocks 10 and holds the printed board 14a. Wire cables 16 connected to the printed board 14a lead out through the pin retainer 14b.

The housing 17 is shaped in a hollow-cylinder, disposed around the plain rod portion 2b of the output shaft 2, and has a flange portion 17a toward one end thereof. A spring holder 26 shaped in a cylinder with solid and hollow portions, and having slits 26a extending in the axial direction, a coil spring 27 working as an extension spring adapted to return to an initial condition after contraction, a stopper plate 28, a pin 29, and two retainer pins 30 are fitted in the housing 17, and O-rings 31 and 32 are disposed in respective grooves formed on the outer circumferential surface of the housing 17. The pin 29 is inserted orthogonally through the plain rod portion 2b of the output shaft 2 and has its both ends sticking out. The coil spring 27 is disposed between the pin 29 and the stopper plate 28 and in contact with both thereof so as to exert its action on both thereof.

The actuator 1 further comprises a rotor case 20 shaped like a cup and disposed between the rotor assembly and the stator assembly, a bearing 18 and a sleeve bearing 33 to support respective ends of the sleeve 3, and collar members 19 and 34.

<Manufacturing Process>

The stator assembly 13 is manufactured as follows.

The stator yokes 7 and 8, which are made of a soft-magnetic material, such as a galvanized steel plate (SECC), an electromagnetic soft steel (SUY), and a silicon steel plate, and which each have a plurality of pole teeth arrayed in a comb-like arrangement, are coupled to each other so as to sandwich the bobbin 9 having the coil 6 wound therearound, such that respective pole tooth arrays intermesh with each other with a gap formed therebetween at a phase difference of 180 degrees in terms of electrical angle. Thus, the first stator unit 3a is completed. The second stator unit 3b is fabricated in the same way.

The first stator unit 3a is stacked on the second stator unit 3b in a mold (not shown) such that the first stator unit 3a is shifted from the second stator unit 3b by an electrical angle of 90 degrees. Synthetic resin, for example, polybutylene terephthalate (PBT), is injected in the mold. The synthetic resin injected fills up the gap between the respective pole tooth arrays of the stator yokes 7 and 8 on each of the first and second stator units 3a and 3b, and at the same time forms lower bosses 21 and upper bosses 22. Thus, the first and second stator units 3a and 3b are rigidly coupled to each other by resin.

The front plate 23 having an opening at its center is put on and welded to the first stator unit 3a such that holes formed in the front plate 23 are engaged with the aforementioned upper bosses 22. Then, the wiring board unit 14, which includes the printed board 14a and the pin retainer 14b formed of synthetic resin, is attached to the outer circumference of the first and second stator units 3a and 3b coupled together. Thus, the stator assembly 13 is completed.

The rotor assembly 5 is manufactured as follows.

The magnet 4 is fixed onto the outer circumference of the sleeve 3 which is provided with the screw portion 3a constituted by a female screw, the bearings 18 and 33 are attached respectively to both axial ends of the sleeve 3, and the sleeve 3 thus furnished is put in the rotor case 20. The rotor case 20 is shaped into a cup-like configuration and has an inner diameter slightly larger than an outer diameter of the magnet 4 so as to allow the magnet 4 to rotate.

The stopper plate 28 is placed on the bearing 18, and the one end of the housing 17 having the flange portion 17a is inserted between the bearing 18 and the rotor case 20 so that the housing 17 presses the stopper plate 28 for fixed attachment. As described above, the housing 17 is hollow-cylindrical and houses the spring holder 26 and the coil spring 27.

The output shaft 2 having the pin 29 as a rotation stopper inserted orthogonally therethough is put through the coil spring 27, and the screw portion 2a of the output shaft 2 is brought into engagement with the screw portion 3a of the sleeve 3. The output shaft 2 has the screw portion 2a and the plain rod portion 2b which are continuous with each other. At a later process, the head piece 25 as a stopper member is to be attached to the open end of the output shaft positioned toward the plain rod portion 2b. A screw hole 25a is formed at the center of the head piece 25, and a valve plug for controlling flow of fluid such as gas is fitted into the screw hole 25a. The pin 29 serves also as a stopper for the coil sprint 27.

The spring holder 26 is attached around the plain rod portion 2b such that the both ends of the pin 29 sticking out from the plain rod portion 2b are put through the slits 26a of the spring holder 26, and then the two retainer pins 30 are put through respective holes formed at the other end of the housing 17 opposite to the one end having the flange portion 17a and through respective grooves formed at one end of the spring holder 26 so that spring holder 26 is not allowed to move with respect to the housing 27. Thus, the rotor assembly 5 is completed.

Respective two portions of the housing 17 and also the spring holder 26, through which the two retainer pins 30 are put, are positioned to oppose each other in the embodiment, but do not have to be so positioned, as long as the spring holder 26 is prevented from rotating with respect to the housing 17.

The rotor case 20 is inserted between the magnet 4 and the stator yokes 7 and 8, and therefore is preferably made of a non-magnetic material, for example, stainless steel, and preferably has a minimum possible thickness with a sufficient strength. Also, the rotor case 20 is preferably fabricated by method of drawing in view of cost. The O-ring 31 is made of an elastic material, such as rubber, is fitted in the groove formed on the outer circumference of the housing 17 so as to hermetically make contact with the rotor case 20, and serves to prevent the housing 17 from coming off the rotor case 20 as well as to seal up the gap between the housing 17 and the rotor case 20.

The rotor case 20 having the rotor assembly 5 housed therein is press-fitted in the center opening of the stator assembly 13, and an additional front plate 24 having a center opening is placed on the front plate 23 so as to press the flange portion 17a of the housing 17. The additional front plate 24 may be fixedly connected to the front plate 23 by mechanical means or by welding. If the front plate 23 is so structured as to press the flange portion 17a of the housing 17, then the additional front plate 24 can be eliminated. And, as mentioned earlier, the head piece 25 is attached to the open end of the output shaft 2, thus completing the actuator 1.

<Operation>

The actuator 1 shown in FIG. 1 has a fail-safe function such that when something abnormal occurs in the actuator 1, for example, power supply is stopped, or a wire for a coil is broken thus interrupting current, a flow control valve is either automatically driven for a safe condition, or automatically closed to shut off gas flow.

Figure 2:
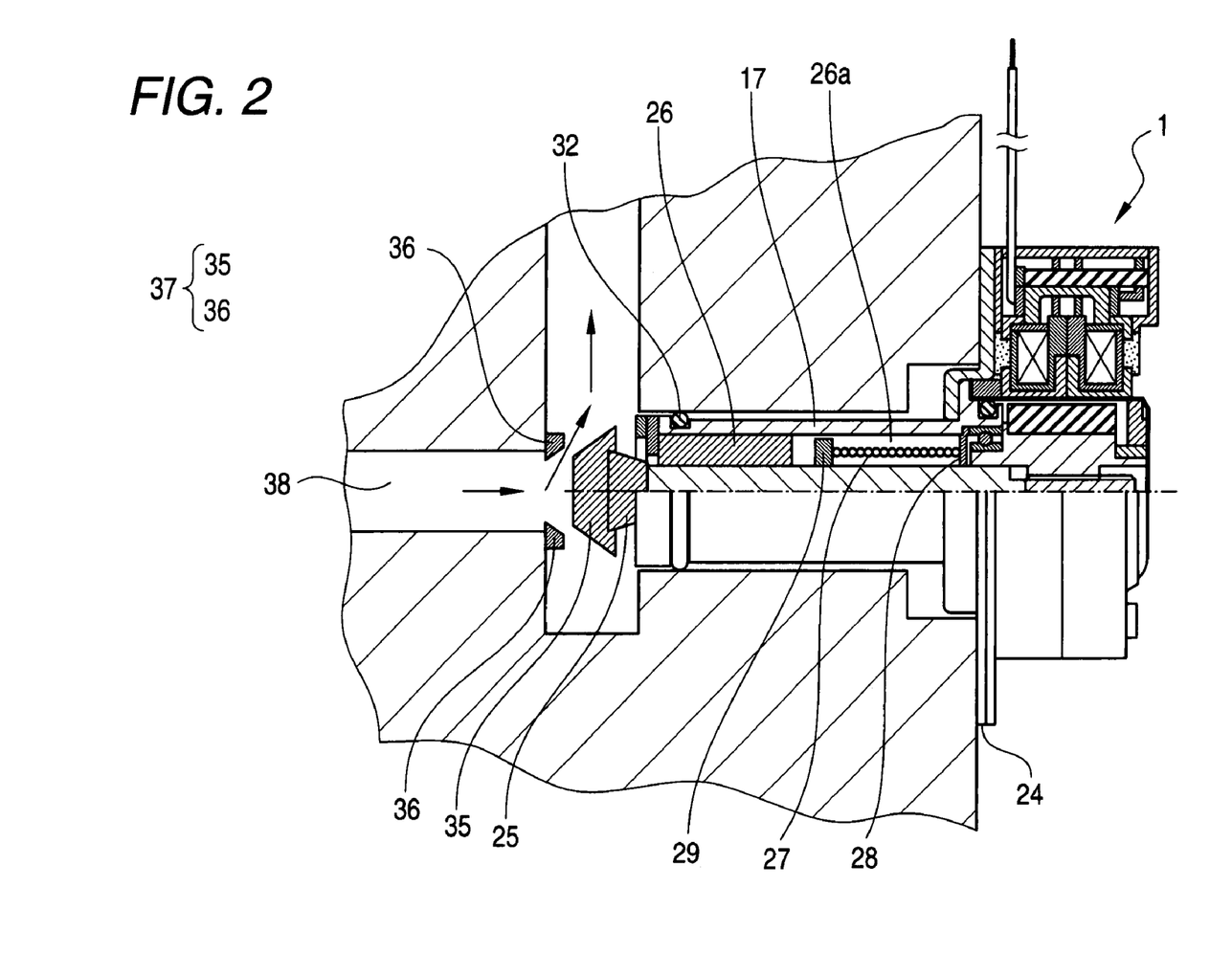
FIG. 2 is a cross sectional view of a fluid channel in which the actuator of FIG. 1 is mounted.

Referring to FIG. 2, the housing 17 of the actuator 1 is put in a hole connecting to a fluid channel 38 such that the step portion of the additional front plate 24 is fitted loosely in a circular recess having a larger diameter than the aforementioned hole. The O-ring 32 provided at the end of the housing 17 seals up the gap between the housing 17 and the wall of the hole. A valve plug 35 is attached to the head piece 25 by press-fitting or by screwing, a valve seat 36 is provided in the fluid channel 38, and the valve plug 35 and the valve seat 16 in combination constitute a flow control valve 37.

When current is applied to the coil 6 of each of the first and second stator units 3a and 3b, the stator yokes 7 and 8 are magnetized with N and S poles (or S and N poles), respectively, whereby the magnet 4 is rotated. Then, the screw portion 3a of the sleeve 3 fixed to the magnet 4 is rotated together, and the output shaft 2 which has the screw portion 2a engaging threadedly with the screw portion 3a is urged to rotate but is prevented from rotating due to the pin 29 set in the axially extending slits 26a of the spring holder 26 and therefore is caused to linearly move in the axial direction. When the output shaft 2 moves toward the rotor sleeve 3 causing the pin 29 to compress the spring coil 27, the valve plug 35 disengages from the valve seat 36, thus the flow control valve 37 is opened allowing gas to flow through the fluid channel 38 as shown in FIG. 2 (the arrows indicate the direction of gas flow). The opening degree of the flow control valve 37 is controlled by the number of steps of the actuator 1.

<Fail-Safe Operation>

Figure 3:
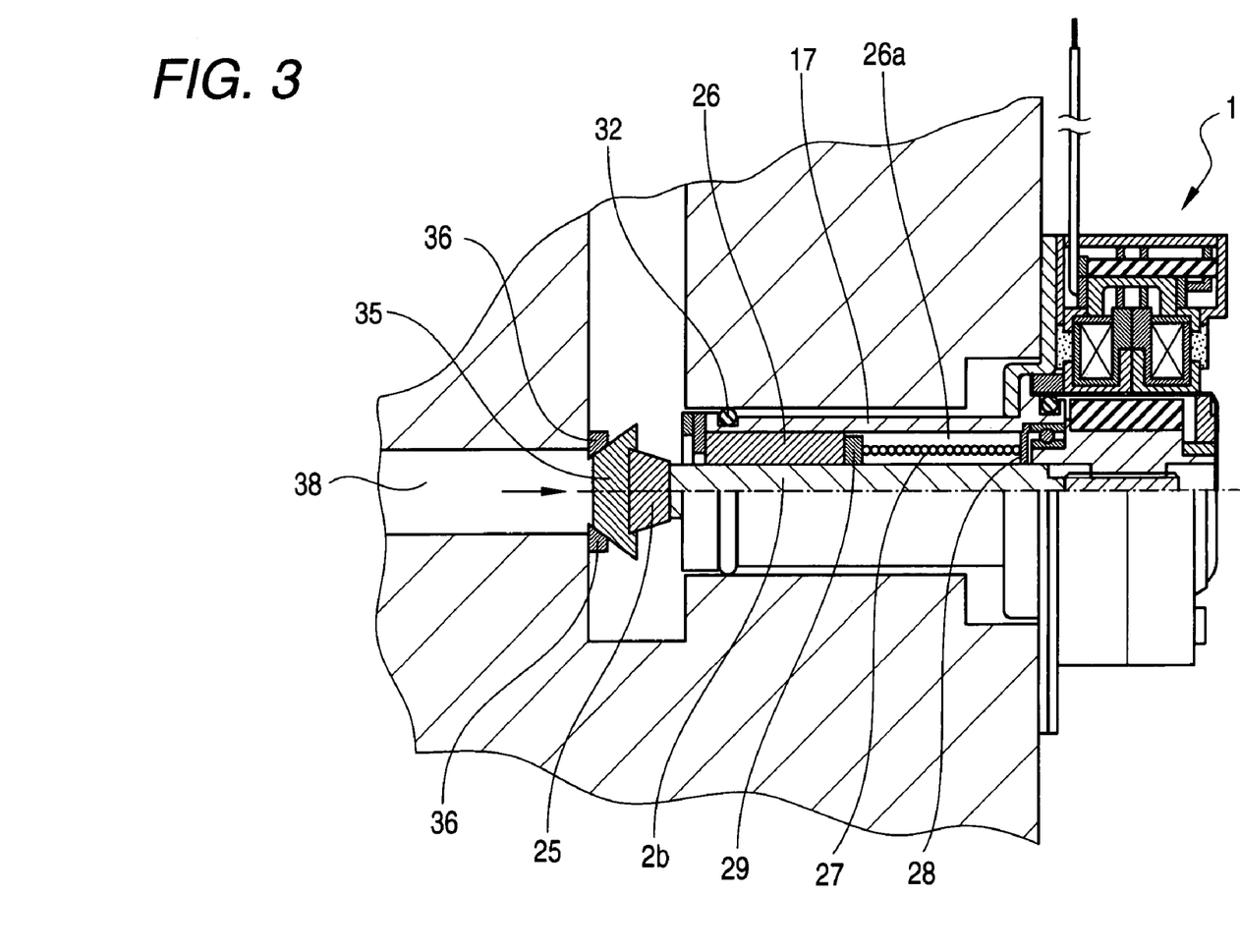
FIG. 3 is an explanatory view of the fluid channel of FIG. 2 for explanation of a fail-safe operation, wherein a flow control valve is closed.

FIG. 3 shows a safe condition, where the valve plug 35 makes tight contact with the valve seat 36 to keep the flow control valve 37 securely closed in order to stop gas flow when power supply is interrupted due to a power failure, or when current flow is interrupted by a wire broken due to a trouble in a control circuit (not shown).

When current flow to the coil 6 is accidentally interrupted, the pin 29 is pressed toward the valve plug 37 by a restoring force of the coil spring 27 with respect to the stopper plate 28 as a reference position, and the output shaft 2 having the pin 29 fixed thereto moves toward the valve seat 36 forcing the sleeve 3 and the magnet 4 to rotate due to the screw portion 2a threadedly engaging with the screw portion 3a until the pin 29 hits the solid portion of the spring holder 26. Thus, the valve plug 35 is brought into hermetic contact with the valve seat 36 by means of the coil spring 27 so as to make the flow control valve 37 closed thereby shutting off gas flow as shown in FIG. 3.

Figure 4:
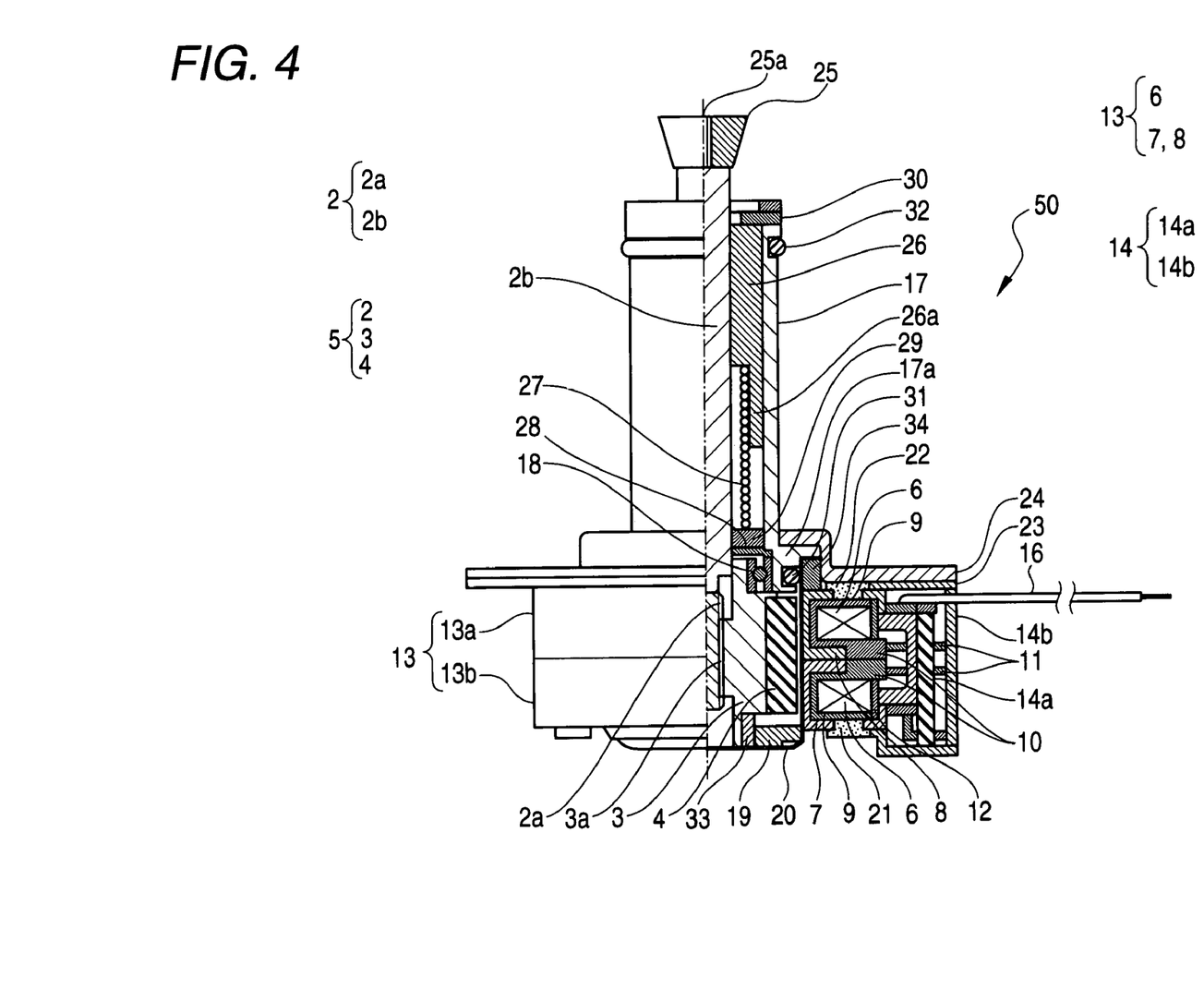
FIG. 4 is a side view (partly cross sectioned) of an actuator according to a second embodiment of the present invention.

A second embodiment of the present invention will hereinafter be described with reference to FIG. 4. An actuator 50 according to the second embodiment of the present invention is structured to operate such that when a load exceeding a predetermined value is accidentally applied to a valve plug, a flow control valve is opened so as to prevent damages to the valve plug and the actuator. The actuator 50 shown in FIG. 4 is structured basically same as the actuator 1 according to the first embodiment shown in FIG. 1, and therefore in explaining the example of FIG. 4, any component parts corresponding to those in FIG. 1 are denoted by the same reference numerals, and description will be focused on the difference from the actuator 1 shown in FIG. 1.

In the actuator 1 according to the first embodiment shown in FIG. 1, the coil spring 27 as an extension spring is provided between the stopper plate 28 and the pin 29 so as to force the valve plug 35 to move to such a position as to make the flow control valve 37 closed, thus performing a fail-safe operation. On the other hand, in the actuator 50 according to the second embodiment shown in FIG. 4, a fail-safe operation is performed such that a coil spring 27 as an extension spring is provided between the solid portion of a spring holder 26 and a pin 29 so as to force a valve plug 35 to move to such a position as to make a flow control valve 37 open.

The difference from the actuator 1 is also found in the configuration of the spring holder 26, and in the position of the coil spring 27. Specifically, the spring holder 26 has shorter slits 26a in the actuator 50 than in the actuator 1, and the pin 29 is located closer to a sleeve 3 in the actuator 50 than in the actuator 1 thereby allowing the coil spring 27 to be provided between the solid portion of the spring holder 26 and the pin 29.

<Manufacturing Process>

A stator assembly 13 of the actuator 50 shown in FIG. 4 is fabricated in the same way as the stator assembly 13 of the actuator 1 shown in FIG. 1, and therefore an explanation thereof will be omitted.

A rotor assembly 5 is fabricated as follows.

A magnet 4 is fixedly attached onto the outer circumference of a sleeve 3, which is formed of, for example, PBT resin, and which is provided with a screw portion 3a constituted by a female screw.

An output shaft 2 includes a screw portion 2a and a plain rod portion 2b. The screw portion 2a is constituted by a male screw, and a head piece 25 as a stopper is attached to an open end of the plain rod portion 2b. The head piece 25 has a screw hole 25a formed at its center, and the aforementioned valve plug 35 for flow control of fluid such as gas is fitted into the screw hole 25a.

Bearings 18 and 33 are attached respectively to both axial ends of the sleeve 3, the sleeve 3 having also the magnet 4 attached thereto is put in a rotor case 20, a stopper plate 28 is placed on the bearing 18, and one end of a housing 17 having a flange portion 17a is inserted inside the rotor case 20 so that the housing 17 presses the stopper plate 28 for fixed attachment. The housing 17 is hollow-cylindrical and houses the spring holder 26 and the coil spring 27.

The coil spring 27 is put in the spring holder 26, and the output shaft 2 with the pin 29 as a rotation stopper is inserted through the spring holder 26 and the coil spring 27. The pin 29 is put orthogonally through the plain rod portion 2b of the output shaft 2 so as to have its both ends sticking out from the outer circumference of the plain rod portion 2b.

The screw portion 2a of the output shaft 2 is engaged threadedly with the screw portion 3a of the sleeve 3 such that the both ends of the pin 29 as a rotation stopper are set in respective slits 26a of the spring holder 26. Then, two retainer pins 30 are put through respective holes formed at the housing 17 and through respective grooves formed at the solid portion of the spring holder 26 so that spring holder 26 is not allowed to move with respect to the housing 27. Thus, the rotor assembly 5 is completed.

Respective two portions of the housing 17 and also the spring holder 26, through which the two retainer pins 30 are put, are positioned to oppose each other in the embodiment, but do not have to be so positioned, as long as the spring holder 26 is prevented from rotating with respect to the housing 17.

The rotor case 20 is inserted between the magnet 4 and stator yokes 7 and 8, and therefore is preferably made of a non-magnetic material, for example, stainless steel, and preferably has a minimum possible thickness with a sufficient strength. Also, the rotor case 20 is preferably fabricated by method of drawing in view of cost. An O-ring 31 is made of an elastic material, such as rubber, is fitted in the groove formed on the outer circumference of the housing 17 so as to hermetically make contact with the rotor case 20, and serves to prevent the housing 17 from coming off the rotor case 20 as well as to seal up the gap between the housing 17 and the rotor case 20.

The rotor case 20 with the rotor assembly 5 housed therein is press-fitted in the center opening of the stator assembly 13, and an additional front plate 24 having a center opening is placed on a front plate 23 so as to press the flange portion 17a of the housing 17. The additional front plate 24 is fixedly connected to the front plate 23 by mechanical means or by welding. If the front plate 23 is so structured as to press the flange portion 17a of the housing 17, then the additional front plate 24 can be eliminated. And, as mentioned earlier, the head piece 25 is attached to the open end of the plain rod portion 2b of the output shaft 2. In this connection, depending on the length of the output shaft 2, current is applied to coils 6 so as to move the output shaft 2 in the direction to compress the coil spring 27 thereby making the open end of the plain rod portion 2b stick out from the end face of the housing 17. Thus, the actuator 50 is completed.

<Operation>

The above-described actuator 50 shown in FIG. 4 is adapted to open the flow control valve 37 when a pressure exceeding a predetermined value is applied to the valve plug 35 in order to protect the valve plug 35 as well as the actuator 50 from being damaged.

Figure 5:
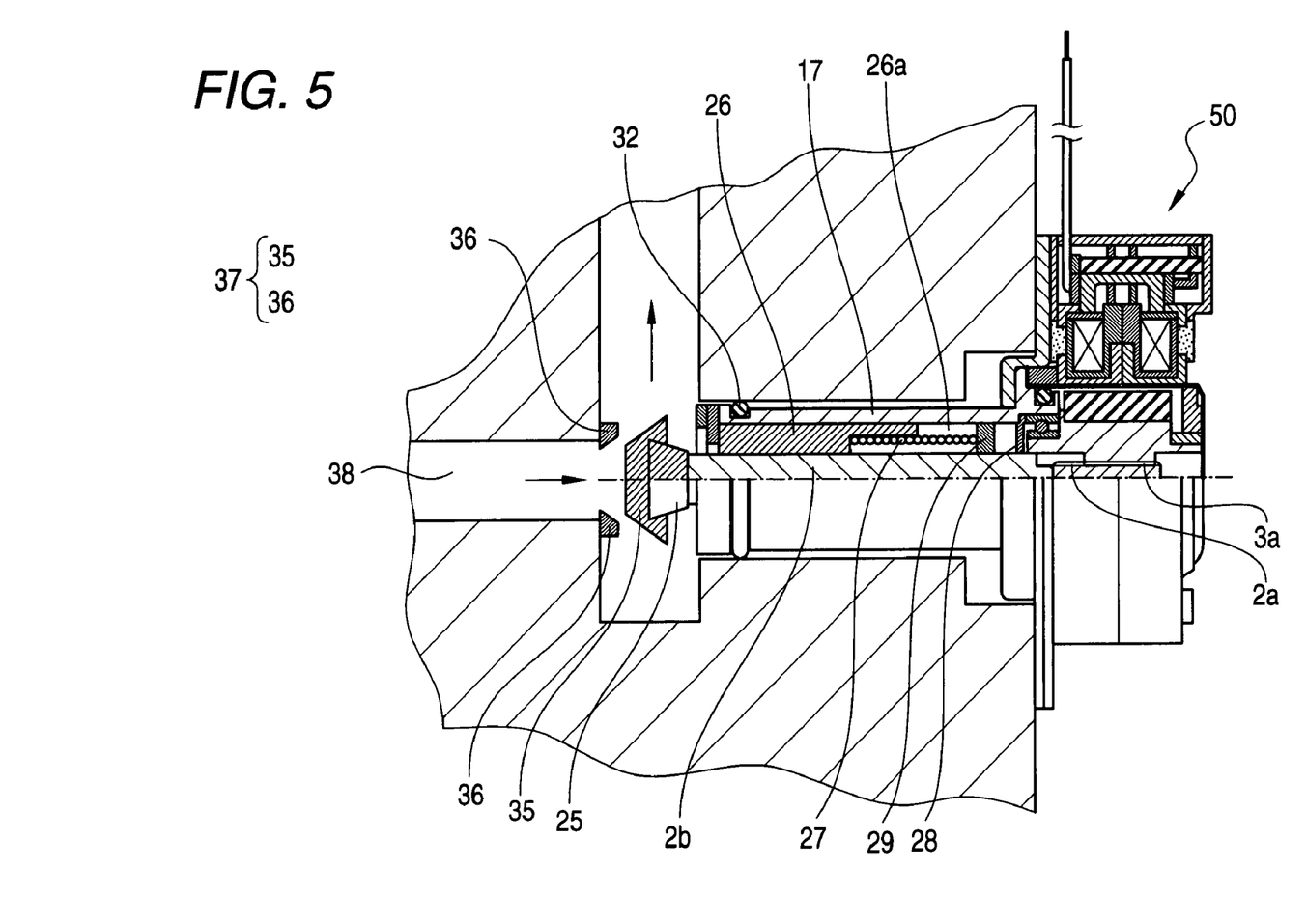
FIG. 5 is a cross sectional view of a fluid channel in which the actuator of FIG. 4 is mounted.

Referring to FIG. 5, the housing 17 of the actuator 50 is put in a hole connecting to a fluid channel 38 such that an O-ring 32 provided at the end of the housing 17 seals up the gap between the housing 17 and the wall of the hole. The valve plug 35 is attached to the head piece 25 by press-fitting or by screwing, a valve seat 36 is provided in the fluid channel 38, and the valve plug 35 and the valve seat 16 in combination constitute the flow control valve 37.

When current is applied to the coil 6, the stator yokes 7 and 8 are magnetized with N and S poles (or S and N poles), respectively, whereby the magnet 4 is rotated. Accordingly, the screw portion 3a of the sleeve 3 fixed to the magnet 4 is rotated together, and the output shaft 2 which has the screw portion 2a engaging threadedly with the screw portion 3a is urged to rotate but is prevented from rotating due to the pin 29 set in the axially extending slits 26a of the spring holder 26 and therefore is caused to linearly move in the axial direction. The output shaft 2 moves toward the valve seat 36 causing the pin 29 to compress the spring coil 27, and stops at a predetermined position for a predetermined opening degree of the flow control valve 37 (the arrows indicate the direction of gas flow). The opening degree of the flow control valve 37 is controlled by the number of steps of the actuator 1.

<Fail-Safe Operation>

Figure 6:
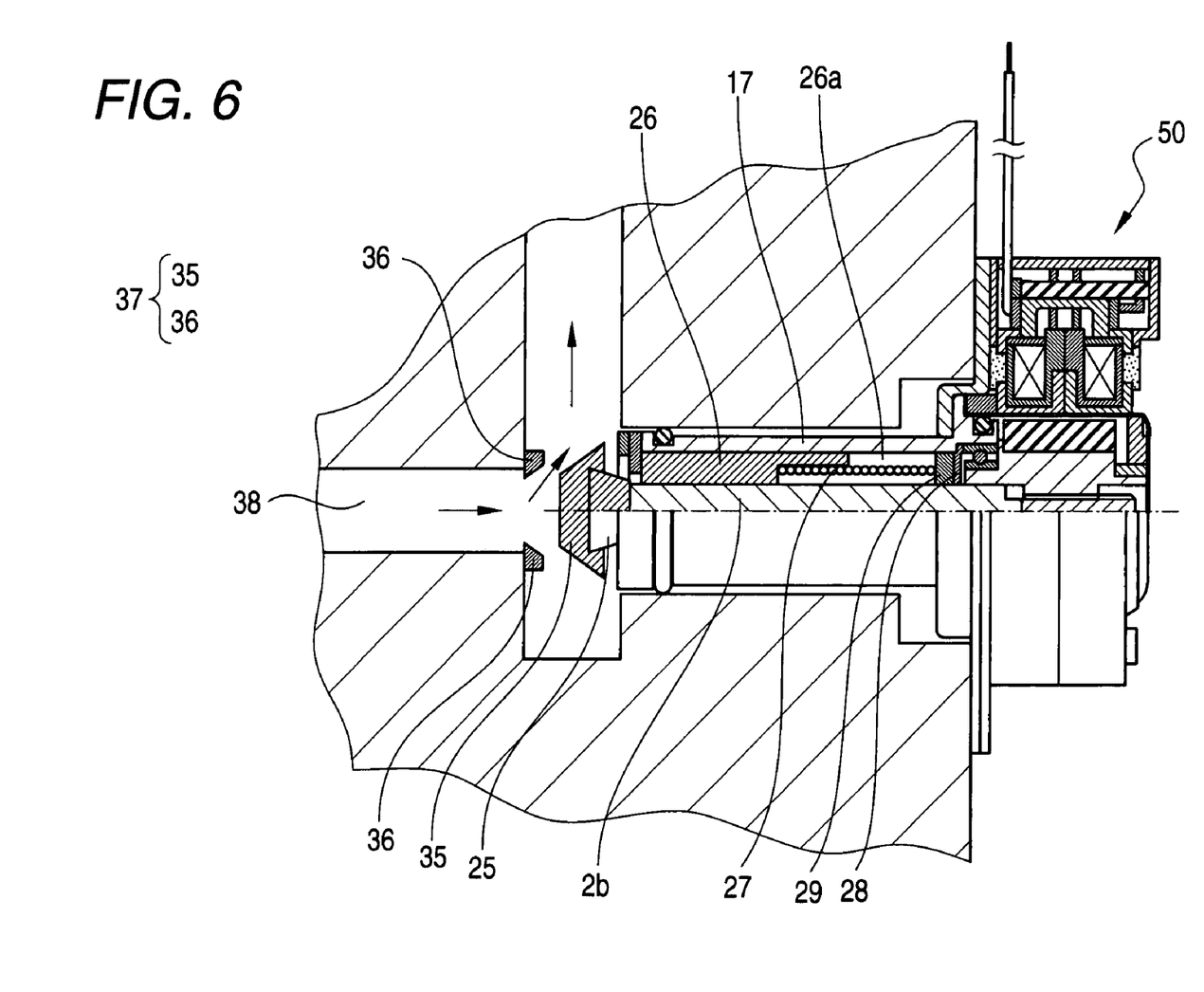
FIG. 6 is an explanatory view of the fluid channel of FIG. 5 for explanation of a fail-safe operation, wherein a flow control valve is open.

FIG. 6 shows a damage-preventive state, in which the flow control valve 37 is opened (or opened wider) so as to relax gas pressure on the valve plug 35 when the pressure of gas flowing through the fluid channel 38 exceeds a prescribed value, whereby the valve plug 35 and the actuator 50 are prevented from being damaged.

When the gas pressure in the fluid channel 38 exceeds a prescribed value, the gas pressure is detected by a sensor (not shown), and an output signal is fed to a control circuit (not shown). Then, the control circuit outputs a control signal to interrupt power supply to the coils 6. When exciting current is interrupted to the coils 6, the coil spring 27 has its configuration restored causing the output shaft 2 to move toward the sleeve 3 forcing the sleeve 3 and the magnet 4 to rotate due to the screw portion 2a threadedly engaging with the screw portion 3a until the pin 29 hits the stopper plate 28. Consequently, the valve plug 35 is pulled away from the valve seat 36 so as to make the flow control valve 37 open wider, whereby the valve plug 35 and the actuator 50 are prevented from being damaged due to gas overpressure.

In the second embodiment described above, the stopper plate 28 is not absolutely required if the pin 29 is otherwise stopped so as to be prohibited from coming into contact with the end of the sleeve 3 including the bearing 18.

In the embodiments described above, an extension coil spring is used for a fail-safe operation in case of emergency, but the present invention is not limited to use of an extension coil spring but may alternatively use a compression coil spring which is extended by application of an external force and is restored for contraction by release of the external force.

When a compression coil spring is used, components must be attached to the compression coil spring in such a manner as to allow its spring force to duly act on the components. Specifically, for example in case of the first embodiment shown in FIG. 1, both ends of the compression coil spring are engagingly attached to the stopper plate 28 and the pin 29, respectively, and in case of the second embodiment shown in FIG. 4, both ends of the compression coil spring are engagingly attached to the solid portion of the spring holder 26 and the pin 29, respectively. Also, the compressed height of the coil spring must be taken into consideration when setting the position of the pin 29.

Alternatively, either an extension coil spring or a compression coil spring may be fastened with an accumulator latch, wherein when reduction in voltage or current of power supply is detected, the latch is electromagnetically released so as to force the output shaft into a safe condition.

Obviously, many modifications and variations of the present invention are possible in light of the above teachings. Thus, it is to be understood that, within the scope of the appended claims, the invention may be practiced otherwise than as specifically described above.

This application is based on Japanese Patent application JP 2004-208122, filed Jul. 15, 2004, the entire content of which is hereby incorporated by reference. This claim for priority benefit is being filed concurrently with the filing of this application.

What is claimed is:

1. An actuator, comprising:
(a) a rotor assembly comprising
an output shaft having a first screw portion with a male screw on an outer circumference of the output shaft, and having a plain rod portion,
a sleeve having a second screw portion with a female screw on an inner circumference of the sleeve, the sleeve rotatably supported by bearings disposed respectively at both axial ends of the sleeve, wherein the first screw portion is threadedly engaged with the second screw portion so as to convert a rotary motion of the sleeve into a linear motion of the output shaft, and
a magnet fixedly disposed at an outer circumference of the sleeve;
(b) a stator assembly that rotates the magnet, and comprises
a coil,
a bobbin having the coil wound therearound, and
stator yokes coupled to each other so as to sandwich the bobbin;
(c) a valve plug attached to the output shaft;
(d) a pin inserted orthogonally through the plain rod portion so as to protrude therefrom in a radial direction;
(e) a hollow cylindrical housing attached to the stator assembly; and
(f) fail-safe mechanism integrally built in the hollow cylindrical housing, the fail-safe mechanism comprising
a coil spring disposed around the output shaft inside the hollow cylindrical housing, and
a spring holder disposed around the output shaft inside the hollow cylindrical housing, and having slits extending parallel to the axial direction of the output shaft, the spring holder being so arranged that ends of the pin protrude into the slits whereby the slits restrict rotation of the output shaft and guide the pin in the axial direction, wherein the valve plug is moved to a predetermined position by a restoring force of the coil spring when the power supply to the stator assembly is interrupted.

2. An actuator according to claim 1, wherein the coil spring is disposed at such a location that the output shaft is caused to move in a direction to achieve a fail-safe operation.

3. An actuator according to claim 2, wherein the coil spring is an extension spring, and located between the pin attached to the output shaft and the spring holder so that when electric power supply to the coil of the stator assembly is cut off, the output shaft is caused to move toward the stator assembly by force of the coil spring.

4. An actuator according to claim 2, wherein the actuator further comprises a stopper plate disposed on one of the bearings located closer to the hollow cylindrical housing, and wherein the coil spring is an extension spring and located between the pin attached to the output shaft and the stopper plate so that when electric power supply to the coil of the stator assembly is cut off, the output shaft is caused to move away from the stator assembly by force of the coil spring.

5. An actuator according to claim 2, wherein the coil spring is a compression spring and located between the pin attached to the output shaft and the spring holder so that when electric power supply to the coil of the stator assembly is cut off, the output shaft is caused to move away from the stator assembly by force of the coil spring.

6. An actuator according to claim 2, wherein the actuator further comprises a stopper plate disposed on one of the bearings located closer to the hollow cylindrical housing, and wherein the coil spring is a compression spring and located between the pin attached to the output shaft and the stopper plate so that when electric power supply to the coil of the stator assembly is cut off, the output shaft is caused to move toward the stator assembly by force of the coil spring.

7. An actuator according to claim 1, wherein the hollow cylindrical housing includes a flange portion at one end portion thereof, and is fixedly attached to the stator assembly by means of a front plate pressing on the flange portion.

8. An actuator according to claim 1, wherein the actuator further comprises a rotor case having a cup-like configuration, the rotor case being disposed between the rotor assembly and the stator assembly so as to constitute a hermetic partition therebetween.

9. An actuator according to claim 1, wherein the actuator further comprises a sealing member disposed around the hollow cylindrical housing.

* * * * *